United States Patent [19]
Otsuka

[11] Patent Number: 6,123,616
[45] Date of Patent: Sep. 26, 2000

[54] SHOCK ENERGY ABSORBING AIR DUCT AND DUCT

[75] Inventor: Kunio Otsuka, Tokyo, Japan

[73] Assignee: Ohtsuka Co., Ltd., Tokyo, Japan

[21] Appl. No.: 09/182,500

[22] Filed: Oct. 30, 1998

[30] Foreign Application Priority Data

Jun. 3, 1998 [JP] Japan .................................. 10-154357

[51] Int. Cl.$^7$ ...................................................... B60H 1/26
[52] U.S. Cl. ........................... 454/137; 296/189; 296/208; 138/122
[58] Field of Search .................................. 454/137, 156; 296/190.09, 208, 189; 138/122

[56] References Cited

U.S. PATENT DOCUMENTS

| | | |
|---|---|---|
| 3,668,039 | 6/1972 | Waksman et al. . |
| 4,164,605 | 8/1979 | Okawa et al. . |
| 5,325,893 | 7/1994 | Takagi et al. . |
| 5,383,815 | 1/1995 | Kiesel et al. ............................ 454/137 |
| 5,750,225 | 5/1998 | Petty . |
| 5,857,734 | 1/1999 | Okamura et al. . |

FOREIGN PATENT DOCUMENTS

| | | |
|---|---|---|
| 61-70335 | 4/1986 | Japan . |
| 62-103617 | 7/1987 | Japan . |
| 5-75580 | 10/1993 | Japan . |
| 5-286458 | 11/1993 | Japan . |

*Primary Examiner*—Harold Joyce
*Attorney, Agent, or Firm*—Foley & Lardner

[57] ABSTRACT

Pipe-like air duct is formed of hard aluminum foil. Concaves and convexes give flexibility to the air duct. For the air duct, kraft paper is wound on both surfaces of the aluminum foil. This air duct is disposed between an outer panel and an inner panel of vehicle body along the panels, laid to the rear seat of the vehicle, and connected to a blow-off port for the rear seat. In a collision of the vehicle, the air duct is subjected to plastic deformation, by which the shock energy caused by an external force is absorbed.

5 Claims, 6 Drawing Sheets

SHOCK ENERGY ABSORBING AIR DUCT AND DUCT

BACKGROUND OF THE INVENTION AND RELATED ART STATEMENT

1. Field of the Invention

The present invention relates to shock energy absorbing air duct and duct which absorb energy caused by an external force applied to a vehicle body and allow the air for an air conditioner to flow.

2. Description of Related Art

An air duct for an automotive air conditioner is usually made of a resin so as to be deformed in some degree because dew condensation is prevented and because the air duct is laid in a limited location where various components within the vehicle are equipped. Also, for a car of a high grade, it is preferable that the cool air of the air conditioner reach the rear seat of a passenger car. Therefore, for example, a one box car is provided with a dual air conditioner so that temperature control for the rear seat can be carried out.

On the other hand, in order to ensure the safety of vehicle, a body panel such as an outer panel and an inner panel has been reinforced. To reinforce the body panel, it is necessary only that the thickness of panel is increased. In this case, however, the weight of vehicle body increases by the increased thickness. As a result, the cost of material is increased, and the production cost also goes up.

OBJECT AND SUMMARY OF THE INVENTION

When an air duct for air conditioner is laid passing through a side panel of vehicle body, it is possible that it is laid between an outer panel and an inner panel, or it is laid between the inner panel and the interior panel.

However, if the air duct is laid between the outer panel and the inner panel, it sometimes cannot be laid because reinforcements or other reinforcing members are present between these panels. Also, if the air duct is laid with priority, the reinforcing members cannot be arranged effectively, so that the panel cannot sometimes be reinforced effectively. Also, if the air duct is laid between the interior panel and the inner panel, the interior panel portion where the air duct is laid protrudes toward the cabin, which deteriorates the appearance.

The present invention was made in view of the above situation, and accordingly an object thereof is to provide a shock energy absorbing air duct, in which an air duct for an air conditioner can also be used as a shock absorbing member.

To achieve the above object, the present invention provides a shock energy absorbing air duct in a vehicle comprising an air conditioner for conditioning the air in the vehicle and an air duct for allowing air to flow in the vehicle, characterized in that the air duct is formed by a flexible, tubular pipe using a non-metallic material at least on the outer surface, and disposed along the panel surface of the vehicle so as to absorb the energy of an external force owing to the plastic deformation of the air duct when the external force is applied to the vehicle body.

Also, to achieve the above object, the present invention provides a shock energy absorbing duct characterized in that the whole or partial surface of a pipe is flocked, and the pipe is disposed along the panel surface of a vehicle so as to absorb the energy of an external force owing to the plastic deformation of the pipe when the external force is applied to the vehicle body.

DETAILED DESCRIPTION OF PREFERRED EMBODIMENTS

A shock energy absorbing air duct in accordance with an embodiment of the present invention will be described below with reference to the accompanying drawings.

FIGS. 1A and 1B and FIGS. 2A and 2B show a construction of a pipe-like air duct 1 in accordance with the present invention. The cross-sectional shape of the air duct 1 may be circular, polygonal, or other shapes, or may be modified into a pillar shape. The figures show an air duct 1 having a circular diametrical cross section.

Figure 2A:
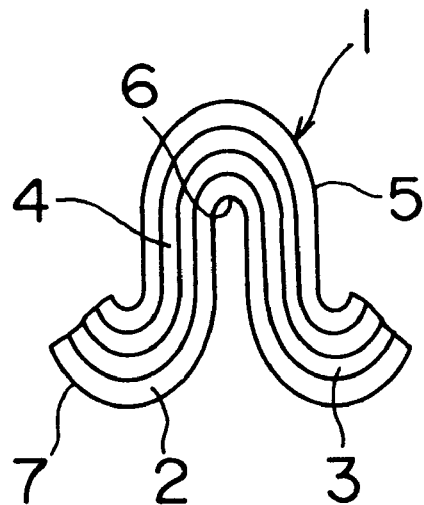
FIG. 2A is an enlarged sectional view of a portion indicated by arrow X in FIG. 1B.
Figure 2B:
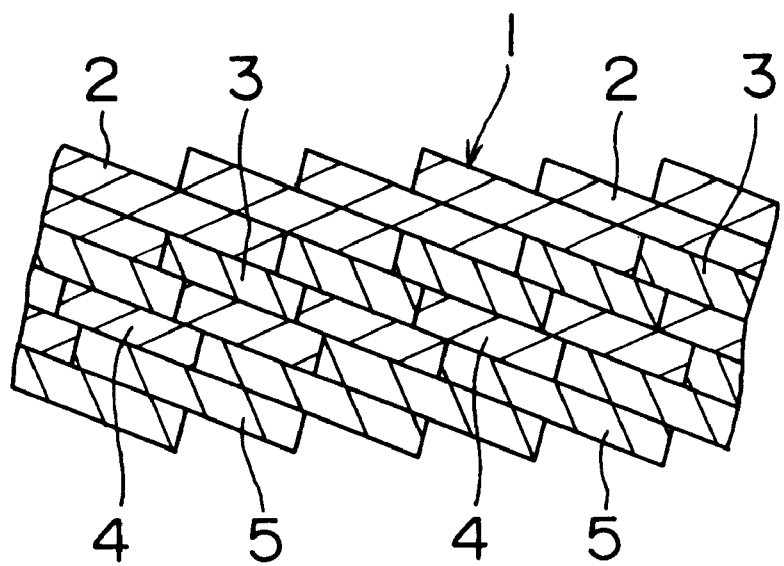
FIG. 2B is a further enlarged sectional view.

For example, as shown in FIGS. 2A and 2B, the surface shape of the air duct 1 is a composite consisting of four layer materials of an outer layer material 2, two intermediate layer materials 3 and 4, and outer layer material 5 in sequence from the outside. Among these, the outer layer material 2 and inner layer material 5 are kraft paper, and the intermediate layer materials 3 and 4 are hard aluminum foil. These layer materials 2 to 5 are wound spirally, and are formed into a duct shape. Also, they are continuous in the axial direction, and form concaves 6 and convexes 7 in a wave form.

The crest and trough of the concave 6 and convex 7 have the same shape, and the pitches between the crests are equal. The concaves 6 and convexes 7 give flexibility to the air duct 1, so that the air duct 1 can be bent into an arbitrary shape, for example, an S shape. The length of the air duct 1 can be changed arbitrarily by cutting. As the metallic material for the air duct 1, iron, steel, copper, stainless steel, and other various metals can be used in addition to aluminum. As a paper material for the outer layer material 2 and inner layer material 5, kraft paper and other kinds of paper can be used. In place of the paper material, a high polymer material may also be used.

The aforementioned composite is not limited to four layers, but may be formed into a plurality of layers other than four layers.

The aforesaid air duct 1 can be flocked on the whole surface thereof, on the side surface only, or at any location in the lengthwise direction by using a flocking machine (manufactured by Mesac Corp.). The flocking principle is as follows:

When piles are placed between an electrode and an earth, the piles are charged and fly toward the earth. If a work is used as the earth, and an adhesive is applied to the work, the piles stick to the work. The ends of the pile are charged positive and negative, respectively, and the central portion is charged zero. Therefore, the pile flies toward the earth charged zero regardless of which end is positive or negative.

The pile has a thickness of 2 to 20 D (denier) and a length of 0.5 to 4 mm. The adhesive is not subject to any special restriction. One example is shown in FIG. 1C. In the figure, piles 8 are planted on one side surface of the duct 1. For the piles 8, 3 D thick, 1 mm long nylons of 80 to 100 g/m$^2$ are caused to stick. It is to be noted that other synthetic resin fibers may be used in place of the nylons. The duct 1 having the shape shown in the figure can be used as a pillar with the flocked surface facing the cabin, whereby the interior of cabin can be omitted.

Figure 1A:
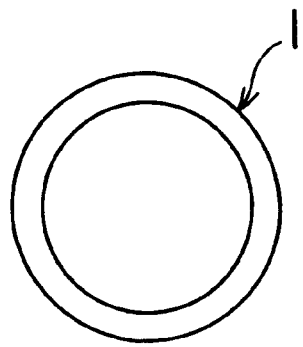
FIG. 1A is a front view of a shock energy absorbing air duct in accordance with an embodiment of the present invention.
Figure 1B:
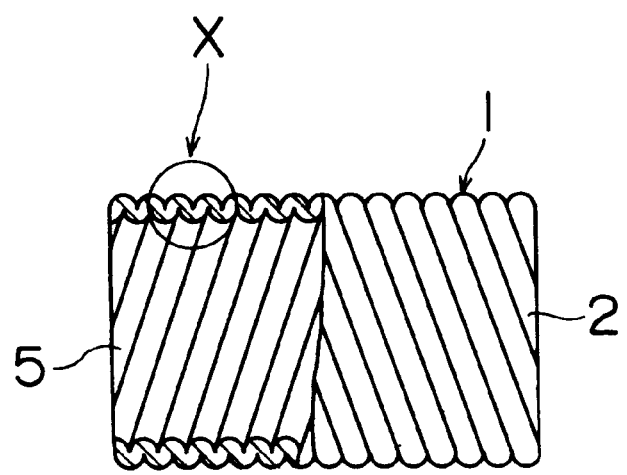
FIG. 1B is a side view of the air duct shown in FIG. 1A.
Figure 1C:
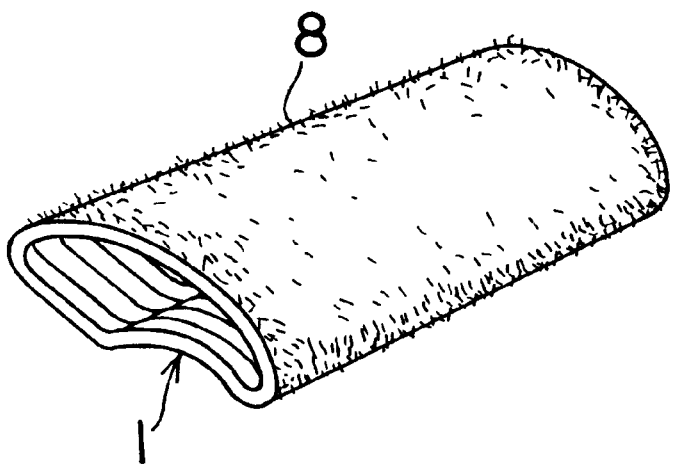
FIG. 1C is a perspective view showing a state in which piles are planted on the duct.

When the long duct 1 shown in FIGS. 1A and 1B is merely inserted or installed with clips between an outer panel and an inner panel of a vehicle as a shock absorbing member, the duct 1 is brought into contact with the vehicle body by the vibration of the vehicle body during running, by which noise may be generated. The piles formed on the surface of the duct 1 can absorb the vibration of vehicle body and prevent the generation of noise.

The following is a description of the characteristics of the air duct 1.

Table 1 gives the detailed construction of the air duct 1 having a rectangular cross section.

cooling unit is disposed. The air duct 1 is laid from the side panel to a front pillar 14, roof side 15, and rear pillar 16, and disposed in a space formed between an inner panel 17 and an outer panel 18 as shown in FIG. 14.

As the air duct 1 is made longer, the flexibility thereof increases, so that the air duct can fit the shape of vehicle body. Therefore, even if the laying location is curved, or has some irregularities, the air duct 1 can be disposed between the panels.

Regarding the fixing method, the air duct 1 is fixed to either of the inner panel 17 and the outer panel 18 by using an adhesive, clip band, or other fixing means. Openings, which are provided at the tip end or intermediate points of the air duct, are connected to blow-off ports on the vehicle body side.

Although the air duct 1 is disposed passing through the pillars 14 and 16 and the roof side 15 in the above embodiment, it may be laid passing through a step for a door entrance, that is, a side sill 19.

Figure 5:
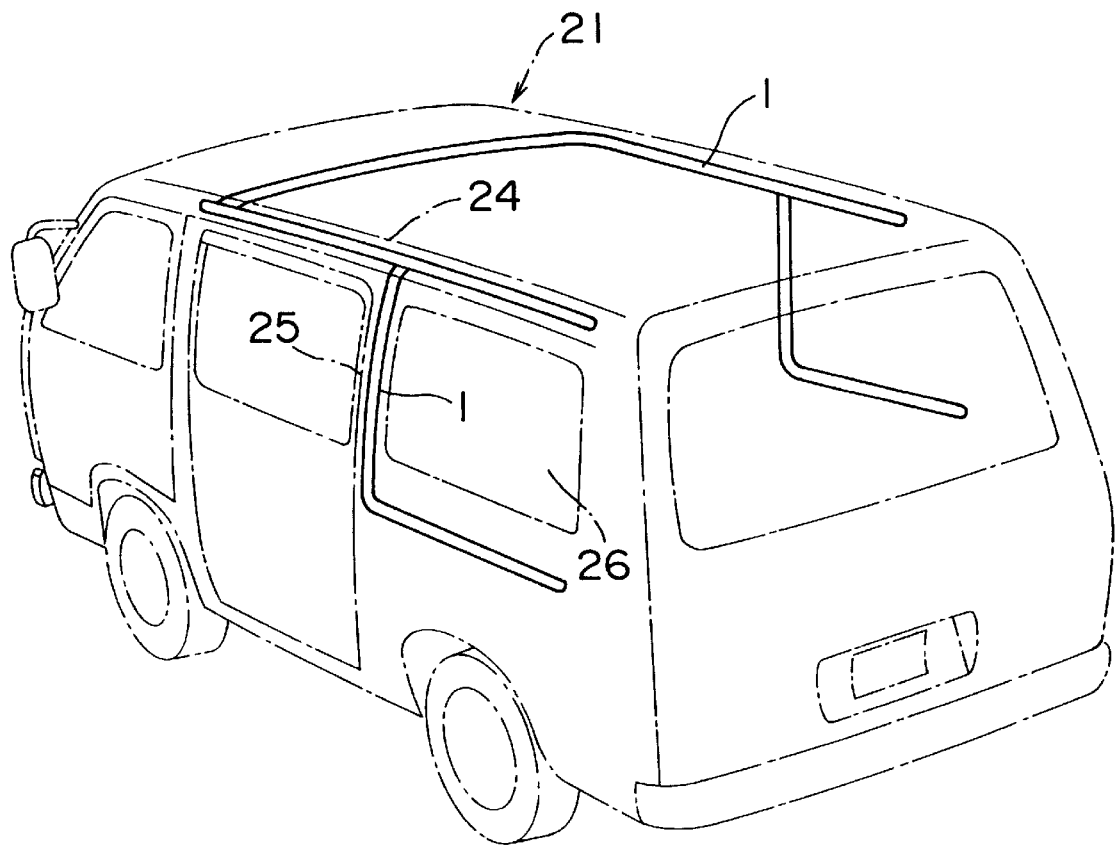
FIG. 5 is a perspective view showing a state in which shock energy absorbing air ducts are disposed on a one box car.
Figure 6:
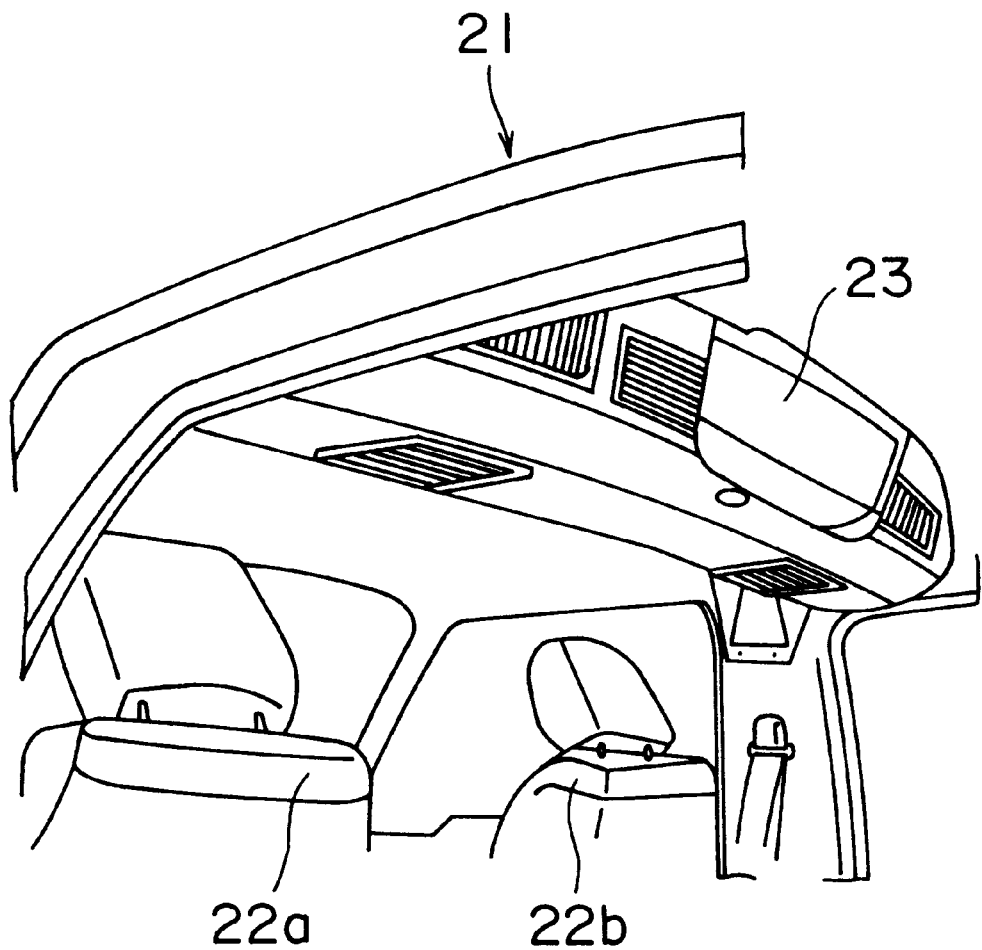
FIG. 6 is a perspective view showing a location where a dual air conditioner for the one box car shown in FIG. 5 is disposed.

FIG. 5 shows a one box type automobile 21 having three seats of front, middle, and rear seats. The automobile 21 is equipped with a dual air conditioner having two cooling units to each of which an evaporator is disposed. As shown in FIG. 6, one of the cooling units 23 is disposed at the rear part of the ceiling of front seats 22a and 22b. Air ducts 1 are, as shown in FIG. 5, laid along the roof sides of the automobile 21 from a connecting port of the cooling unit 23, and disposed so as to extend to the rear. Although not shown in the figure, the air duct 1 may be laid along a rear pillar.

TABLE 1

| Type | Outside width (mm) | Shape | Duct material | | | Number of crests per 100 mm length | Weight (g) per 100 mm length |
| --- | --- | --- | --- | --- | --- | --- | --- |
| | | | Kraft paper | Hard aluminum | Kraft paper | | |
| 1 | 20 | Square | t0.2 × W60 | t0.09 × W35 | t0.2 × W60 | 52 | 11.03 |
| 2 | 26 | ↑ | ↑ | t0.1 × W35 × 2 | ↑ | 52 | 23.49 |

In Table 1, t denotes a thickness, and W denotes a width. Type 1 is an air duct in which one layer of hard aluminum is wound, while type 2 is an air duct in which two layers thereof are wound. These air ducts 1 were subjected to a load test. The results were that the air duct was collapsed and the inside surfaces thereof touched each other under a load of about 220 kgf for type 1 and about 460 kgf for type 2. These results show that the air duct 1 has a sufficient strength as a shock absorbing member.

Regarding the strength of the air duct 1, the deformation under a load can be changed by rounding the corners. The larger the radius of roundness is, the greater the deformation under a load is. Further, the tuning for strength can be performed by changing the thickness and width of material and the pitch of convexes.

The following is a description of concrete application examples of the air duct 1.

Figure 3:
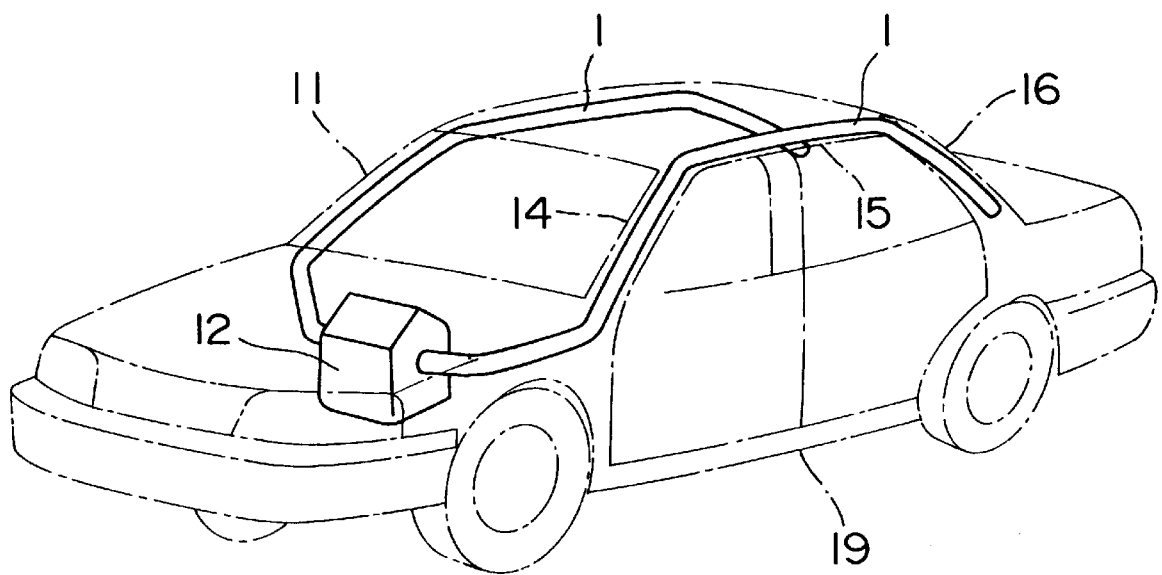
FIG. 3 is a perspective view showing a state in which shock energy absorbing air ducts in accordance with the embodiment of the present invention are disposed in a vehicle.
Figure 4:
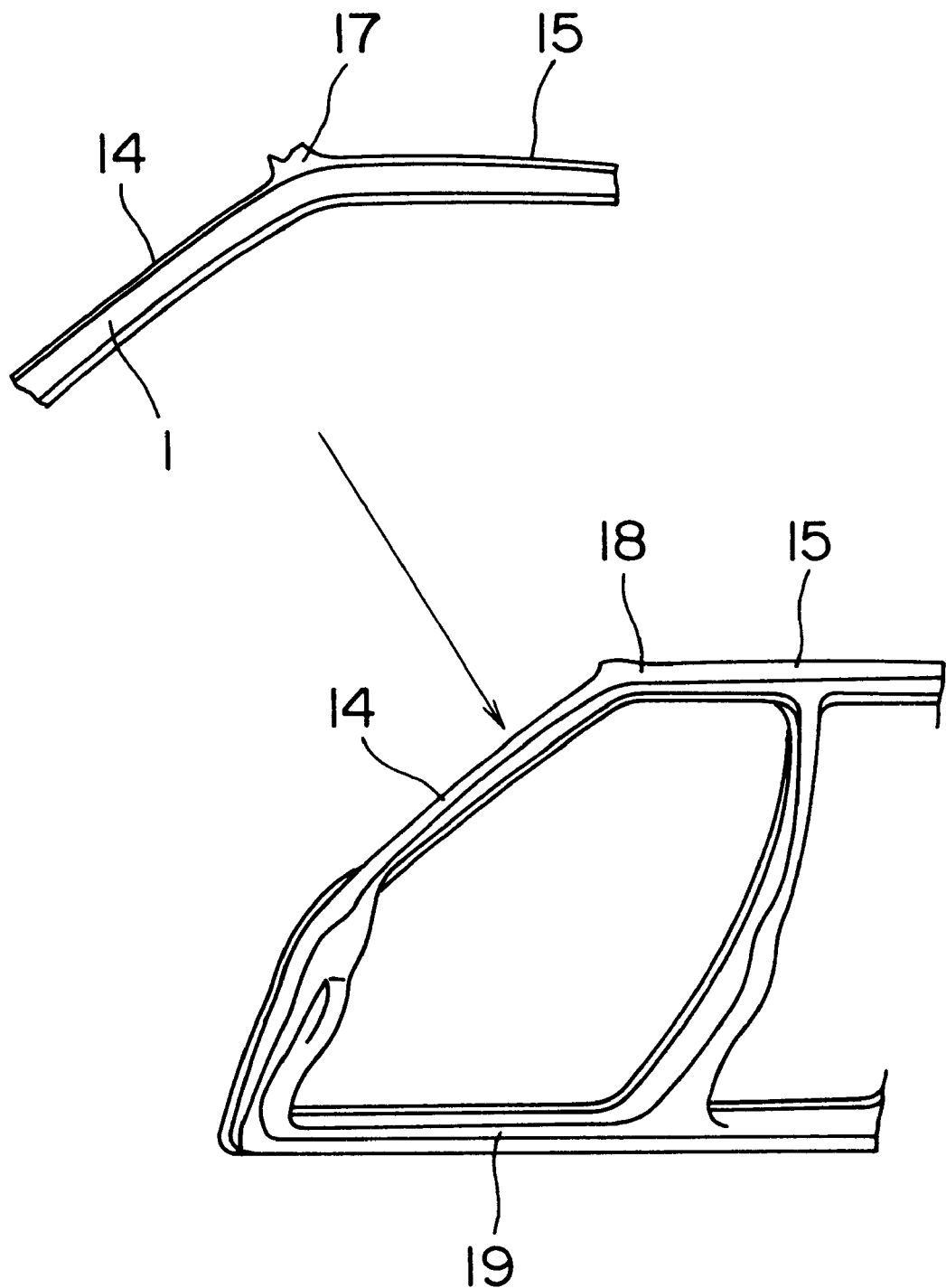
FIG. 4 is a perspective view showing a state in which a shock energy absorbing air duct is installed on an inner panel.

FIG. 3 shows a general automobile 11. At the front part of the automotive cabin, a cooling unit 12 for a cooler, which is an air conditioner, is mounted. The cooling unit 12 is connected with the air ducts 1 for supplying air. The air duct 1 is disposed along a side panel of the automobile 11 from the inside of an instrument panel (not shown) where the Also, the air duct 1 is caused to branch at a center pillar 25 at the halfway point of the roof side 24, disposed downward, and extended rearward at the lower part of a window glass 26.

The air duct 1 is installed to a panel by being arranged in a space between an outer panel and an inner panel by using an adhesive or other fixing means.

Thus, for the vehicle body of one box type, in the automobile having three seats of front, middle, and rear ones, the air duct 1 can be laid to the rear seat as well as the front and middle seats, and can be connected to blow-off ports disposed in a side panel or the like.

In the case of this dual air conditioner, the air duct 1 may be extended rearward from the other cooling unit disposed at the instrument panel portion. Also, the air duct 1 can be disposed between roof panels or between side panels of a micro-bus or a large-sized bus, in which long air ducts must be laid, not the general one box car.

The air duct 1 according to this embodiment of the present invention allows the air from the cooling unit (or heater unit) to flow. The air duct 1 has a high heat retaining property because it uses kraft paper as the outer layer material 2 and the inner layer material 5, thereby preventing dew condensation caused on the surface of the air duct 1.

When an external force is applied to the automobile 11, 21, the air duct 1 is subjected to plastic deformation, so that the energy of the external force is absorbed, by which the deformation of vehicle body and the shock given to the vehicle body can be reduced. Thereupon, the injury of passenger caused by collision is alleviated or prevented.

Also, even if the location where the air duct 1 is to be installed is curved or has some irregularities, the air duct 1 can be installed by being bent so as to fit that shape, so that the air duct 1 has flexibility regardless of the type of vehicle. Therefore, it is unnecessary to form an air duct for each type of vehicle. Because being flexible, the air duct 1 is easy to install, and also light in weight in relation to high strength, so that it does not increase the vehicle weight so much.

An embodiment of the present invention has been described above. Needless to say, the present invention is not limited to this embodiment, but can be modified variously based on the technical concept of the present invention.

For example, although the air duct 1 is formed of hard aluminum foil and kraft paper in the above embodiment, a resin may be wound or applied as a heat insulating material in place of the kraft paper. Also, although the air duct 1 is formed by winding aluminum foil spirally, the surface of a normal tube may be formed into a wave form with concaves and convexes to provide flexibility.

For the duct to which piles are planted as shown in FIG. 1C, piles may be planted on a composite or on an ordinary pipe.

As described above, the present invention provides a shock energy absorbing air duct in a vehicle comprising an air conditioner for conditioning the air in the vehicle and an air duct for allowing air to flow in the vehicle, characterized in that the air duct is formed by a flexible, tubular pipe using a non-metallic material at least on the outer surface, and disposed along the panel surface of the vehicle so as to absorb the energy of an external force owing to the plastic deformation of the air duct when the external force is applied to the vehicle body. Therefore, the air duct not only allows air to flow but also has an effect as a shock energy absorbing member. Specifically, the air duct can absorb the energy caused by an external force applied to the vehicle body without increasing the weight of vehicle so much, so that the shock given to the passenger and the damage to other components equipped on the vehicle can be reduced.

Also, when a duct is used as a shock absorbing member by flocking the surface of duct, the vibration of vehicle body during running can be absorbed, so that the occurrence of noise can be prevented.

What is claimed is:

1. A shock energy absorbing air duct in a vehicle comprising an air conditioner for conditioning the air in the vehicle and an air duct for allowing air to flow in the vehicle, wherein:

said air duct is formed by a flexible, tubular pipe using a non-metallic material at least on the outer surface, concaves and convexes are formed on both sides of the pipe, and said air duct is disposed along a panel surface of the vehicle so as to absorb the energy of an external force owing to a plastic deformation of said air duct when the external force is applied to the vehicle.

2. A shock energy absorbing air duct according to claim 1, wherein said air conditioner is a cooler, a cooling unit for said cooler is mounted at the ceiling portion of a cabin, and said air duct is connected to an air discharge port of said cooling unit.

3. A shock energy absorbing air duct according to claim 1, wherein said tubular pipe is formed by winding a hard aluminum foil and the non-metallic material is kraft paper.

4. A shock energy absorbing air duct according to claim 3, wherein kraft paper is wound around both sides of the pipe.

5. The shock energy absorbing air duct according to claim 1, wherein a whole or partial surface of the tubular pipe is flocked.

* * * * *